United States Patent
Zhang

(10) Patent No.: US 11,765,226 B2
(45) Date of Patent: Sep. 19, 2023

(54) METHOD FOR PROVISIONING INTERNET OF THINGS DEVICE AND INTERNET OF THINGS DEVICE

(71) Applicant: GUANGDONG OPPO MOBILE TELECOMMUNICATIONS CORP., LTD., Guangdong (CN)

(72) Inventor: Jun Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 66 days.

(21) Appl. No.: 17/556,230

(22) Filed: Dec. 20, 2021

(65) Prior Publication Data

US 2022/0116450 A1 Apr. 14, 2022

Related U.S. Application Data

(63) Continuation of application No. PCT/CN2019/093105, filed on Jun. 26, 2019.

(51) Int. Cl.
*H04L 41/0806* (2022.01)
*H04L 9/40* (2022.01)
(Continued)

(52) U.S. Cl.
CPC ...... *H04L 67/1044* (2013.01); *H04L 41/0806* (2013.01); *H04L 63/10* (2013.01); *H04L 67/12* (2013.01)

(58) Field of Classification Search
CPC ........ G16Y 30/00; G16Y 30/10; G16Y 40/35; G16Y 40/50; H04W 4/50; H04W 4/70; H04W 12/50; H04W 84/20; H04W 8/005; H04W 4/08; H04L 67/12; H04L 67/10; H04L 41/0806; H04L 63/10; H04L 63/102; H04L 63/061; H04L 63/0876; H04L 63/0815; H04L 65/1073
See application file for complete search history.

(56) References Cited

U.S. PATENT DOCUMENTS 9,801,216 B1 * 10/2017 Williams ............... H04W 12/50
10,460,263 B1 * 10/2019 Martin ................... G06Q 10/02
(Continued)

FOREIGN PATENT DOCUMENTS

CN 105721426 A 6/2016
CN 106161100 A 11/2016
(Continued)

OTHER PUBLICATIONS

International Search Report with English Translation for PCT Application PCT/CN2019/093105 dated Mar. 27, 2020 (13 pages).

*Primary Examiner* — David R Lazaro
(74) *Attorney, Agent, or Firm* — Young Basile Hanlon & MacFarlane, P.C.

(57) ABSTRACT

A method for provisioning an internet of things device and a device are provided. The method includes discovering, by a first device, an unprovisioned second device, and configuring, by the first device, a device owner identity (ID) of the second device, where the first device is a sub-onboarding tool (sub-OBT), the configured device owner ID of the second device is the same as a device owner ID of the first device, and devices with the same device owner ID are able to communicate mutually.

9 Claims, 7 Drawing Sheets

200

CONFIGURE, BY THE FIRST DEVICE, A CREDENTIAL RESOURCE OF A SECOND DEVICE, WHERE THE CONFIGURED CREDENTIAL RESOURCE OF THE SECOND DEVICE INCLUDES CREDENTIAL INFORMATION OF EACH OF OTHER DEVICES WITH THE SAME DEVICE OWNER ID AS THE SECOND DEVICE — 230

CONFIGURE, BY THE FIRST DEVICE, AN ACCESS CONTROL RESOURCE OF THE SECOND DEVICE, WHERE THE CONFIGURED ACCESS CONTROL RESOURCE OF THE SECOND DEVICE INCLUDES ACCESS CONTROL INFORMATION OF EACH OF DEVICES WITH THE SAME DEVICE OWNER ID AS THE SECOND DEVICE — 240

(51) Int. Cl.
*H04L 67/12* (2022.01)
*H04L 67/104* (2022.01)

(56) References Cited

U.S. PATENT DOCUMENTS

| | | | |
|---|---|---|---|
| 2011/0211559 | A1 | 9/2011 | Lim et al. |
| 2015/0161066 | A1* | 6/2015 | Matsuda .................. G06F 21/44 |
| | | | 710/4 |
| 2015/0282223 | A1* | 10/2015 | Wang .................... H04W 12/35 |
| | | | 455/41.2 |
| 2016/0088161 | A1* | 3/2016 | Parent .................. H04M 7/0024 |
| | | | 348/14.01 |
| 2018/0183796 | A1* | 6/2018 | Smith ..................... H04L 67/10 |
| 2019/0295345 | A1* | 9/2019 | Takigawa ............... B60R 25/241 |
| 2019/0349426 | A1* | 11/2019 | Smith .................. H04L 67/1093 |
| 2020/0154261 | A1* | 5/2020 | Ko ........................ H04W 84/18 |
| 2021/0152417 | A1* | 5/2021 | Baird .................... H04L 12/281 |
| 2021/0250764 | A1* | 8/2021 | Ha ........................ H04W 12/40 |
| 2021/0345072 | A1* | 11/2021 | Selvanesan ............. H04W 4/06 |
| 2021/0391981 | A1* | 12/2021 | Okano .................. H04L 9/0833 |
| 2022/0012101 | A1* | 1/2022 | Lee ....................... H04L 12/413 |
| 2022/0029831 | A1* | 1/2022 | Baek .................... H04L 9/3268 |
| 2022/0029843 | A1* | 1/2022 | Enderby ............ H04N 21/4788 |
| 2022/0116450 | A1* | 4/2022 | Zhang ................ H04L 67/1044 |
| 2022/0353239 | A1* | 11/2022 | Ru ..................... H04W 40/246 |

FOREIGN PATENT DOCUMENTS

| | | |
|---|---|---|
| CN | 106326646 A | 1/2017 |
| CN | 106681292 A | 5/2017 |
| CN | 109194751 A | 1/2019 |

* cited by examiner

200

```
┌─────────────────────────────────────────────┐
│ CONFIGURE, BY THE FIRST DEVICE, A CREDENTIAL│
│ RESOURCE OF A SECOND DEVICE, WHERE THE      │
│ CONFIGURED CREDENTIAL RESOURCE OF THE SECOND│ ── 230
│ DEVICE INCLUDES CREDENTIAL INFORMATION OF   │
│ EACH OF OTHER DEVICES WITH THE SAME DEVICE  │
│ OWNER ID AS THE SECOND DEVICE               │
└─────────────────────────────────────────────┘
                      │
┌─────────────────────────────────────────────┐
│ CONFIGURE, BY THE FIRST DEVICE, AN ACCESS   │
│ CONTROL RESOURCE OF THE SECOND DEVICE, WHERE│
│ THE CONFIGURED ACCESS CONTROL RESOURCE OF   │ ── 240
│ THE SECOND DEVICE INCLUDES ACCESS CONTROL   │
│ INFORMATION OF EACH OF DEVICES WITH THE SAME│
│ DEVICE OWNER ID AS THE SECOND DEVICE        │
└─────────────────────────────────────────────┘
```

```
┌──────────┐                              ┌──────────┐
│  THIRD   │                              │  FIRST   │
│  DEVICE  │                              │  DEVICE  │
└──────────┘                              └──────────┘
     │  250. INSTRUCT TO UPDATE A CREDENTIAL     │
     │  RESOURCE AND/OR ACCESS CONTROL           │
     │←──────────── RESOURCE ────────────────────│
┌────┴──────────────────────────────┐            │
│ 261. UPDATE THE CREDENTIAL        │            │
│ RESOURCE, WHERE THE UPDATED       │            │
│ CREDENTIAL RESOURCE INCLUDES      │            │
│ CREDENTIAL INFORMATION OF A       │            │
│ SECOND DEVICE                     │            │
└───────────────────────────────────┘            │
┌- - - - - - - - - - - - - - - - - ┐             │
│ 262. UPDATE THE ACCESS CONTROL   │             │
│ RESOURCE, WHERE THE UPDATED      │             │
│ ACCESS CONTROL RESOURCE          │             │
│ INCLUDES ACCESS CONTROL          │             │
│ INFORMATION OF THE SECOND DEVICE │             │
└- - - - - - - - - - - - - - - - - ┘             │
```

FIG. 4

METHOD FOR PROVISIONING INTERNET OF THINGS DEVICE AND INTERNET OF THINGS DEVICE

CROSS-REFERENCE TO RELATED APPLICATION(S)

This application is a continuation of International Application No. PCT/CN2019/093105, filed on Jun. 26, 2019, the entire disclosure of which is hereby incorporated by reference.

TECHNICAL FIELD

Implementations of the disclosure relates to the technical field of communication, and in particular to a method for provisioning an internet of things (IoT) device and an IoT device.

BACKGROUND

With the development of technology, IoT and smart home applications gradually enter daily lives of people. When a new IoT device enters a home, a cell phone of a user can be used to provision the new device, including configuring the new device to access a network, and configuring a user attribute, a credential, an access rights, etc. of the new device, and then the new device enters an "operable state", i.e., other devices can access the new device. For example, if the new device is an air conditioner, the air conditioner can be provisioned by the cell phone, and then the provisioned air conditioner can be controlled by the cell phone. Currently, there is usually only one device that can provision other devices in a home. However, under a condition that only one device can provision the other devices, if the device cannot provision the other devices at current time, for example, when the device is outside the home at current time, the new device cannot be provisioned, which affects user experience.

SUMMARY

In the disclosure, a method for provisioning an internet of things (IoT) device and an IoT device are provided.

According to a first aspect, a method for provisioning an IoT device is provided. The method includes discovering, by a first device, an unprovisioned second device, and configuring, by the first device, a device owner identity (ID) of the second device, where the first device is a sub-onboarding tool (sub-OBT), the configured device owner ID of the second device is the same as a device owner ID of the first device, and devices with the same device owner ID are able to communicate mutually.

According to a second aspect, a method for provisioning an IoT device is provided. The method includes updating, by a third device, a device configuration resource (DCR) of the third device according to an indication from a first device, where the updated DCR of the third device includes credential information of a second device and/or access control information of the second device. The third device is a main-onboarding tool (main-OBT). The first device is a sub-OBT. The second device is provisioned by the first device. A device owner ID of the second device is the same as a device owner ID of the first device, and devices with the same device owner ID are able to communicate mutually.

According to a third aspect, an IoT device is provided. The IoT device is a first device. The first device includes a processor and a memory configured to store a computer program. The computer program, when executed by the processor, causes the processor to: discover an unprovisioned second device, and configure a device ID of the second device, where the first device is a sub-OBT, the configured device owner ID of the second device is the same as a device owner ID of the first device, and devices with the same device owner ID are able to communicate mutually.

BRIEF DESCRIPTION OF DRAWINGS

FIG. 3 is a schematic flow chart illustrating a method for provisioning an IoT device according to other implementations of the disclosure.

FIG. 4 is a process-interaction diagram illustrating a method for provisioning an IoT device according to other implementations of the disclosure.

DETAILED DESCRIPTION

Technical solutions in implementations of the disclosure will be described below with reference to accompanying drawings.

Among various internet of things (IoT) devices in a home, there is usually a device that can provision other devices, for example, when a new device joins a network, the device configures a user attribute, a credential, an access rights, etc., of the new device, such that the new device enters an "operable state", and then other devices can access the new device. Usually, there is only one device in the home that undertakes a provision work, that is, there is only one device in the home that can provision other devices. When there are multiple users in the home, there may be multiple devices. If only one device can complete the provision work, when the device is not in the home, the new device cannot be provisioned.

In implementations of the disclosure, multiple devices with a provision function, such as a cell phone, a pad, and the like, can be used to provision a new device, simplifying a condition of provisioning the new device. Multiple devices can be configured to provision a new device in a home, where the multiple devices are called onboarding tools (OBTs) which include a main-OBT and at least one sub- OBT. The main-OBT is the first OBT in the home and can provision the sub-OBT and a device without an OBT function. The sub-OBT can be provisioned by the main-OBT or other sub-OBTs. There may be only one main-OBT but multiple sub-OBTs in the home.

Figures 1, 2:
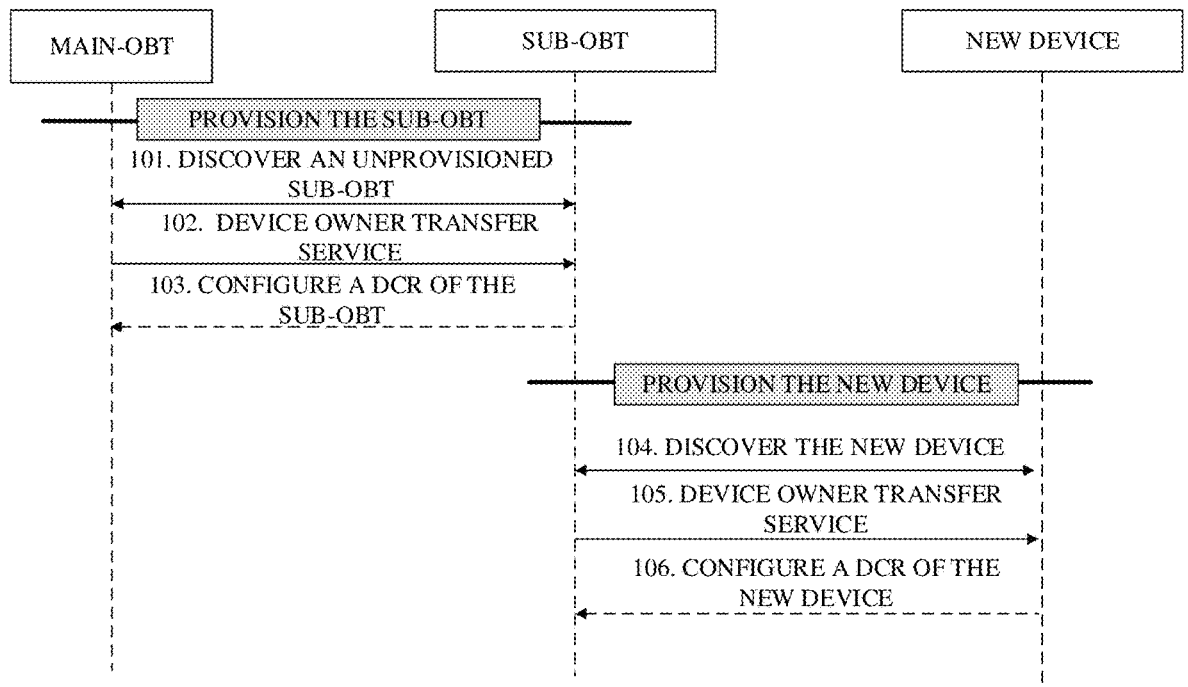
FIG. 1 is a process-interaction diagram illustrating provisioning a device by a main-onboarding tool (OBT) and a sub-OBT.
FIG. 2 is a schematic flow chart illustrating a method for provisioning an internet of things (IoT) device according to implementations of the disclosure.

For example, as illustrated in FIG. 1, a main-OBT provisions a sub-OBT, and the provisioned sub-OBT provisions a new device.

At block 101, the main-OBT discovers an unprovisioned sub-OBT.

At block 102, a device owner transfer process is performed between the main-OBT and the sub-OBT.

In this process, a main operation is to change an owner identity (ID) of the new device as follows. A device ID and a device owner ID of the new device are configured. The device ID of the new device is a unique ID of the new device. The device owner ID of the new device is indicative of a user to which the new device belongs, i.e., an owner of the new device. Generally, the device owner ID of the new device is configured to be a device ID of an OBT that provisions the new device.

After the device owner transfer process is completed, the device owner ID of the new device is configured to be the device ID of the OBT that provisions the new device, indicating that the new device and the OBT that provisions the new device belong to a same user. For devices, belonging to a same user is a basis for mutual communication between the devices.

At block 102, after the main-OBT configures a device owner ID of the sub-OBT, the device owner ID of the sub-OBT is configured to be a device ID of the main-OBT. The sub-OBT can then access the network.

It can be understood that a device owner ID of the main-OBT is the same as the device ID of the main-OBT.

At block 103, the main-OBT configures a device configuration resource (DCR) of the sub-OBT.

The main-OBT configures the DCR of the sub-OBT as follows. A credential resource and an access control resource of the sub-OBT are configured. The credential resource is used for authentication of the sub-OBT and a peer device. The access control resource is indicative of a permission of accessing resources of the sub-OBT by other devices.

At block 104, the sub-OBT discovers a new device.

When discovering the new device, the provisioned sub-OBT can provision the new device.

At block 105, a device owner transfer process is performed between the sub-OBT and the new device.

In this process, the sub-OBT configures a device ID and a device owner ID of the new device. The device ID of the new device is a unique ID of the new device. The device owner ID of the new device is configured to be a device ID of the sub-OBT.

At block 106, the sub-OBT configures a DCR of the new device.

In this process, the sub-OBT configures a credential resource and an access control resource of the new device.

Under a current technical framework, after performing the above-mentioned operations, the device owner ID of the sub-OBT is the device ID of the main-OBT, that is, the sub-OBT and the main-OBT belong to a same user and can communicate mutually. The device owner ID of the new device is the device ID of the sub-OBT, i.e., the new device and the sub-OBT belong to a same user and can communicate mutually. However, since the new device is not provisioned by the main-OBT, the device owner ID of the new device is different from the device ID of the main-OBT, such that the new device and the main-OBT cannot communicate mutually.

However, the above-mentioned three devices all belong to a family or a user, and the three devices are expected to be able to communicate mutually in practical applications.

Therefore, when there are multiple OBTs in a home, in order to realize that new devices provisioned by different OBTs can communicate mutually, a solution is provided below in implementations of the disclosure, which will be described in detail with reference to FIG. 2.

Methods in implementations of the disclosure can be applied to an IoT system. A first device, a second device, and a third device described below may be IoT devices (or called IoT terminals), or intelligent devices, where the IoT devices may include, for example, a cell phone, a pad, a wearable device, an air conditioner, a lamp, a utility meter, etc., and the intelligent devices may be used in multiple fields, such as an intelligent security field, an atmospheric monitoring field, and an air monitoring field. These devices all can work in an IoT environment, i.e., an IoT communication can be conducted among these devices. Among these devices, a device that can provision other devices is called an OBT, such as a cell phone, a pad, etc., and a device that cannot provision other devices is called a non-OBT. The IoT device hereinafter is also simplified as "device". Without special illustrations, "device" or "other devices" hereinafter may include an OBT and may also include a non-OBT.

FIG. 2 is a schematic flow chart illustrating a method 200 for provisioning an IoT device according to implementations of the disclosure. FIG. 2 illustrates a first device and a second device, where the first device is a sub-OBT, and the second device is a new device. The method 200 includes all or a part of operations below.

At block 210, the first device discovers an unprovisioned second device.

The first device has an OBT function. Under a condition that the first device has been provisioned by a main-OBT or another sub-OBT, the first device can provision other new devices. The second device may be an OBT provisioned by the first device, or a non-OBT provisioned by the first device.

For example, the first device can transmit a device query request via a broadcast message or a multicast message, to obtain information of an unprovisioned new device and then provision the unprovisioned new device.

At block 220, the first device configures a device owner ID of the second device.

The configured device owner ID of the second device is the same as a device owner ID of the first device.

In the implementation, when the first device provisions the second device, the device owner ID of the second device is configured to be the same as the device owner ID of the first device rather than same as a device ID of the first device. Devices can communicate with each other in case that the devices have the same device owner ID, and thus by means of the method, the second device can be enabled to communicate with devices provisioned by other OBTs.

The first device may be provisioned by the main-OBT. In this case, the device owner ID of the first device is a device ID of the main-OBT.

The first device may also be provisioned by another sub-OBT. In this case, the device owner ID of the first device is a device owner ID of the another sub-OBT that provisions the first device.

Based on the method illustrated in this implementation, a configured device owner ID of a device is configured to be a device owner ID of another device that provisions the device. Therefore, whether the first device is provisioned by the main-OBT or another sub-OBT, the device owner ID of the first device is the same as the device ID of the main-OBT.

Thereafter, when the first device provisions the second device, the device owner ID of the second device is configured to be the same as the device owner ID of the first device, such that the device owner ID of the second device is the same as the device ID of the main-OBT. In this case, the second device not only can communicate with the main-OBT, but also can communicate with devices provisioned by different OBTs.

After configuring the device ID and the device owner ID of the second device, the second device has a unique device ID, and the device owner ID of the second device is the same as the device owner ID of the first device. After the device owner transfer process, the first device may further configure a DCR of the second device, for example, configure a credential resource and an access control resource of the second device. The configured credential resource of the second device includes credential information of each of other devices with the same device owner ID as the second device.

In an implementation of the disclosure, a DCR of a device is a device configuration resource, for example, including a credential resource and an access control resource of the device. Correspondingly, a non-configuration resource (NCR) may include a switch resource of a lamp, a temperature resource of an air conditioner, and the like. Devices with the same device owner ID communicating mutually or interconnecting as stated above indicates that, among the devices, an NCR of any device can be accessed by any other devices. It may be that only an OBT that provisions a device can access a DCR of the device, but an NCR of the device can be accessed by all other devices with the same device owner ID as the device according to a corresponding access control resource.

A credential resource of a device can be used for identity confirmation, such as confirming an identity of a peer device, or verifying a credential chain of a credential provided by the peer device, to determine whether a connection can be established between the two devices. An access control resource of the device includes access control information of each other device, and the access control information of each other device indicates a permission of accessing the device by each other device, i.e., a manner in which each other device accesses a resource of the device.

Devices with the same device owner ID may exchange credential information of each other and add access control information of each other.

In an implementation, as illustrated in FIG. 3, after the operation at block 220, the method 200 in this implementation of the disclosure further includes operations at blocks 230 and 240.

At block 230, the first device configures a credential resource of the second device.

The configured credential resource of the second device includes credential information of each of other devices with the same device owner ID as the second device.

For example, the first device can transmit the credential information of each of the other devices with the same device owner ID as the second device to the second device. After the second device obtains the credential information of each of the other devices with the same device owner ID as the second device, the second device can authenticate each of the other devices via the credential information of each of the other devices in a follow-up communication process.

It can be understood that, the credential information of each of the other devices with the same device owner ID obtained by the second device includes credential information of a main-OBT, credential information of each of sub-OBTs, and credential information of each of non-OBTs.

In an implementation, the first device can instruct each of other devices provisioned by the first device to update a credential resource of each of the other devices, where the updated credential resource of each of the other devices provisioned by the first device includes credential information of the second device.

Each of the other devices provisioned by the first device may also add the credential information of the second device to the credential resource of each of the other devices. In this case, devices with the same device owner ID exchange credential information of each other, where the credential information can be used for an identity confirmation before mutual communication is conducted.

In an implementation, the first device can instruct the main-OBT to update a credential resource of the main-OBT, where the updated credential resource of the main-OBT includes the credential information of the second device.

Likewise, the first device can transmit the credential information of the second device to the main-OBT, and then the main-OBT updates the credential resource of the main-OBT, i.e., adds the credential information of the second device to the credential resource of the main-OBT.

Further, the main-OBT can also transmit the credential information of the second device to each of other devices except the first device. For example, the main-OBT transmits the credential information of the second device to each of other sub-OBTs except the first device, and then each of the other sub-OBTs can transmit the credential information of the second device to each of devices provisioned by each of the other sub-OBTs.

In an implementation, if the first device has a permission to access a DCR of each of other devices with the same device owner ID as the first device, the first device can instruct each of the other devices with the same device owner ID as the first device to update a credential resource of each of the other devices, where the updated credential resource of each of the other devices includes the credential information of the second device. For example, the first device transmits the credential information of the second device to each of the other sub-OBTs, and each of the other sub-OBTs can transmit the credential information of the second device to each of devices provisioned by each of the other sub-OBTs.

At block 240, the first device configures an access control resource of the second device.

The configured access control resource of the second device includes access control information of each of devices with the same device owner ID as the second device.

The access control information may be, for example, access control entity (ACE) information. An ACE of a device can define a manner in which the device can access a resource. The access control resource includes an access control list (ACL), where the ACL includes ACE information of each of different devices.

In response to reception of second configuration information by the second device, according to an indication in the second configuration information, the second device adds ACE information of each of other devices with the same device owner ID as the second device to the ACL of the second device. When each of the other devices accesses the second device, each of the other devices can determine a permission of accessing the second device according to the ACE information of each of the other devices in the ACL.

It can be understood that, the configured access control resource of the second device includes the access control information of each of the devices with the same device owner ID as the second device, i.e., access control information of the main-OBT, access control information of each of sub-OBTs, and access control information of each of non-OBTs.

In an implementation, the first device can instruct each of the other devices provisioned by the first device to update an access control resource of each of the other devices provisioned by the first device, where the updated access control resource of each of the other devices provisioned by the first device includes access control information of the second device.

Each of the other devices provisioned by the first device may also add the access control information of the second device to the access control resource of each of the other devices. In this case, devices with the same device owner ID exchange access control information of each other, where the access control information can be used for an identity confirmation before mutual communication is conducted.

In an implementation, the first device can instruct the main-OBT to update an access control resource of the main-OBT, where the updated credential resource of the main-OBT includes the credential information of the second device.

The main-OBT can update an ACL of the main-OBT, i.e., add the ACE information of the second device to the ACL of the main-OBT, to configure a permission of accessing the main-OBT by the second device. The above-mentioned operation may not be necessary because the second device may have no permission to access any resources of the main-OBT. In this case, the ACL of the main-OBT does not contain the ACE information of the second device.

Further, the main-OBT can inform each of other devices except the first device to add the access control information of the second device to each of the other devices. For example, the main-OBT informs each of the other sub-OBTs except the first device to add the access control information of the second device to each of the other sub-OBTs, and each of the other sub-OBTs can inform each of devices provisioned by each of the other sub-OBTs to add the access control information of the second device to each of the devices.

In an implementation, if the first device has a permission to access a DCR of each of the other devices with the same device owner ID as the first device, the first device can instruct each of the other devices with the same device owner ID as the first device to update an access control resource of each of the other devices, where the updated access control resource of each of the other devices includes the access control information of the second device. For example, the first device informs each of the other sub-OBTs to add the access control information of the second device to each of the other sub-OBTs, and each of the other sub-OBTs can inform each of the devices provisioned by each of the other sub-OBTs to add the access control information of the second device to each of the devices.

For example, with reference to a process-interaction diagram illustrated in FIG. 4, a third device in FIG. 4 is, for example, a main-OBT. The third device can identify the third device as the main-OBT, to indicate that the third device can provision each of other devices. A first device is a sub-OBT, for example, the first device is the sub-OBT provisioned by the third device. A second device is provisioned by the first device, where a device owner ID of the second device is the same as a device owner ID of the first device.

At block 250, the first device instructs the third device to update a DCR of the third device. The DCR of the third device includes, for example, a credential resource and/or an access control resource of the third device.

The third device updates the DCR of the third device according to an indication from the first device. When the first device instructs the third device to update the credential resource of the third device, the third device performs an operation at block 261. When the first device instructs the third device to update the access control resource of the third device, the third device performs an operation at block 262.

At block 261, the third device updates the credential resource of the third device.

The first device can transmit credential information of the second device to the third device, and the third device adds the credential information of the second device to the credential resource of the third device.

At block 262, the third device updates the access control resource of the third device.

The third device can update an ACL of the third device, i.e., add access control information (i.e., ACE information) of the second device to the ACL of the third device. When the second device accesses the third device, the second device can determine a manner in which the second device accesses a resource of the third device according to the ACE information of the second device in the third device.

The operation at block 262 may not be necessary because the third device is the main-OBT, and the second device may have no permission to access any resources of the main-OBT. In this case, the first device may just inform the main-OBT to add the credential information of the second device to the main-OBT.

In an implementation, before the operation at block 210, the method further includes identifying, by the first device, the first device as the sub-OBT. That is, when the first device with an OBT function is provisioned, the first device identifies the first device as the sub-OBT, indicating that the first device can provision other devices.

Correspondingly, the main-OBT can also identify the main-OBT as a main-OBT, indicating that the main-OBT can provision other devices.

Since different devices can communicate with each other under a condition that the devices have the same device owner ID, under a condition that the first device configures the device owner ID of the second device to be the same as the device owner ID of the first device, and causes credential information and access control information of the third device to be added to the second device and credential information and access control information of the second device to be added to the third device, even the second device is not provisioned by the third device, the third device and the second device can also communicate mutually.

Further, the main-OBT can transmit the credential information of the second device to each of other devices except the first device. For example, the main-OBT transmits the credential information of the second device to each of other sub-OBTs except the first device, and then each of the other sub-OBTs can transmit the credential information of the second device to each of devices provisioned by each of the other sub-OBTs.

Further, the main-OBT can inform each of the other devices except the first device to add the access control information of the second device to each of the other devices. For example, the main-OBT informs each of the other sub-OBTs except the first device to add the access control information of the second device to each of the other sub-OBTs, and then each of the other sub-OBTs can inform each of devices provisioned by each of the other sub-OBTs to add the access control information of the second device to each of the devices.

In combination with FIG. 5 and FIG. 6, two detailed implementation manners of the above-mentioned methods will be described below.

Figure 5:
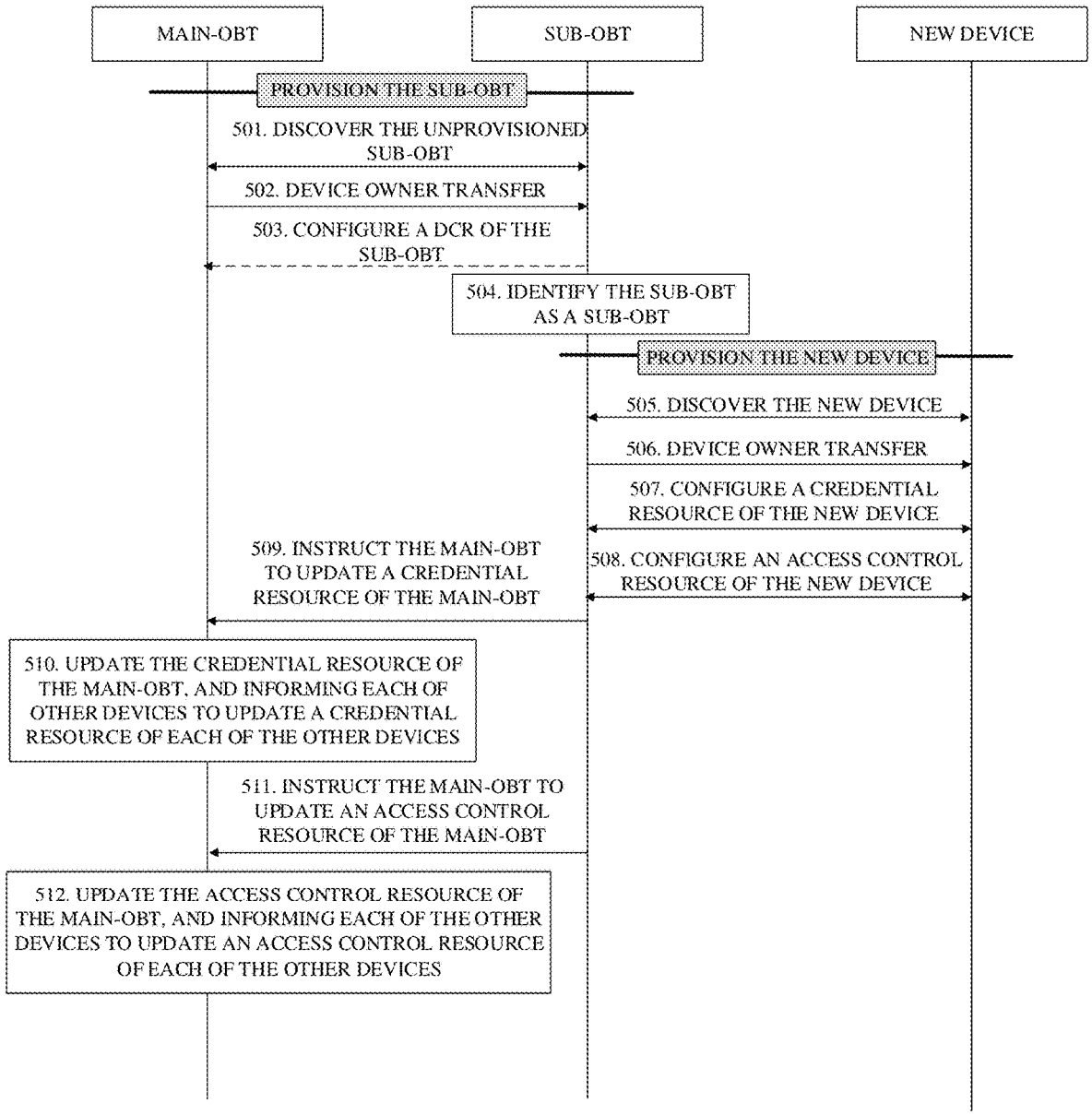
FIG. 5 is a process-interaction diagram illustrating an implementation of the methods illustrated in FIG. 2 to FIG. 4.
Figure 6:
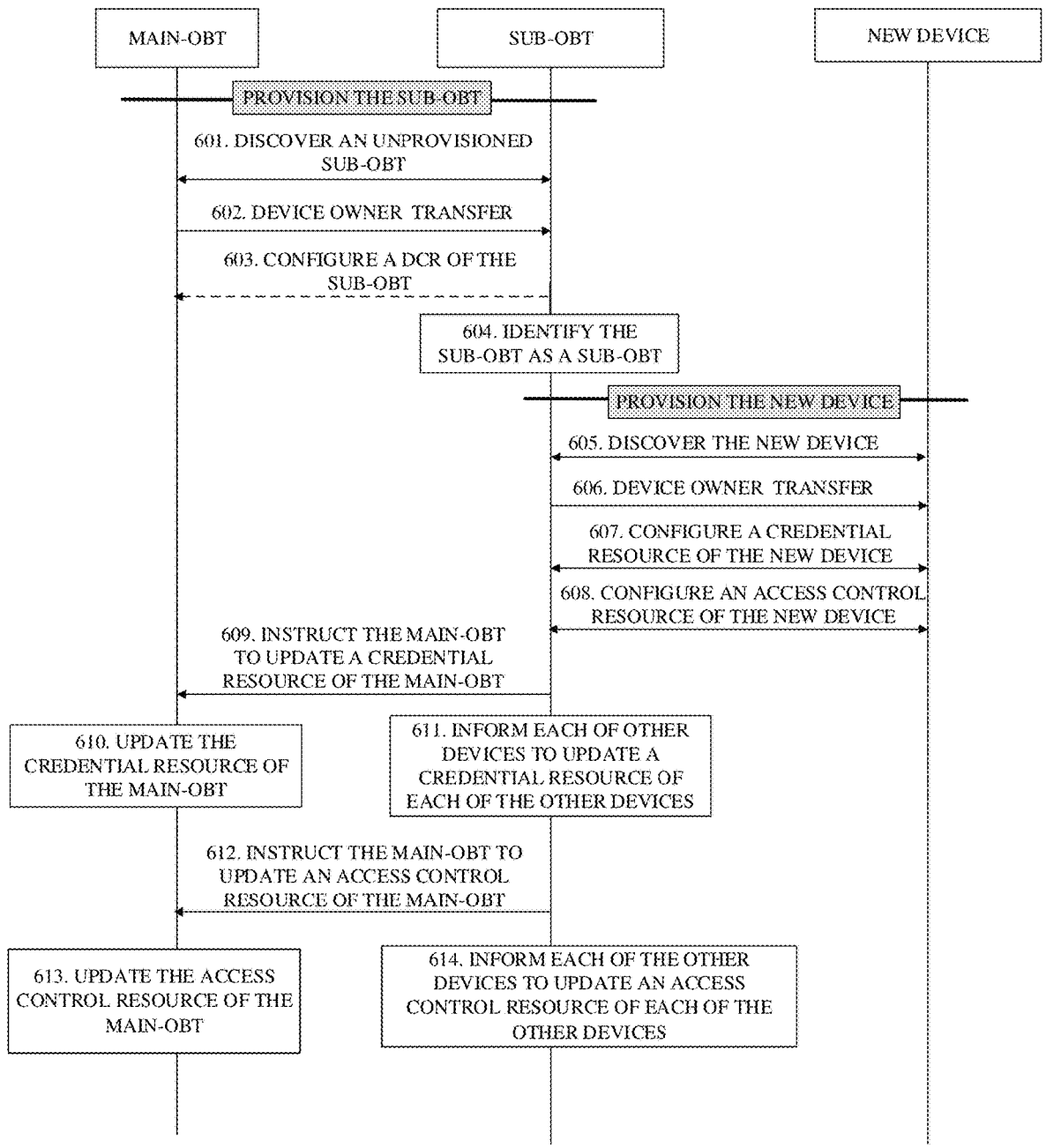
FIG. 6 is a process-interaction diagram illustrating another implementation of the methods illustrated in FIG. 2 to FIG. 4.

FIG. 5 and FIG. 6 illustrate a third device, a first device, and a second device. The third device is identified as a main-OBT that can provision the first device. The provisioned first device is identified as a sub-OBT. The first device is configured to provision the second device, where the second device is a new device.

As illustrated in FIG. 5, the method includes the following.

At block 501, the main-OBT discovers an unprovisioned sub-OBT.

For example, the main-OBT can transmit a device query request via a broadcast message or a multicast message, and provision a new device when the main-OBT discovers the new device.

At block 502, a device owner transfer process is performed between the main-OBT and the sub-OBT.

In this process, the main-OBT configures a device ID and a device owner ID of the sub-OBT. The device ID of the sub-OBT is a unique ID of the sub-OBT. The device owner ID of the sub-OBT is configured to be the same as a device ID of the main-OBT, indicating that the sub-OBT and the main-OBT belong to a same user.

At block 503, the main-OBT configures a DCR of the sub-OBT.

For example, the main-OBT configures the DCR of the sub-OBT, and adds credential information of each of other devices with the same device owner ID as the sub-OBT to the sub-OBT, to confirm identities of the main-OBT and the sub-OBT. The main-OBT establishes an ACL in the sub-OBT, and adds ACE information of each of the other devices with the same device owner ID as the sub-OBT to the ACL of the sub-OBT.

In addition, the main-OBT can also instruct each of the other devices with the same device owner ID as the sub-OBT to update a credential resource and an access control resource of each of the other devices, i.e., add credential information of the sub-OBT to the credential resource of each of the other devices and add access control information of the sub-OBT to the access control resource of each of the other devices.

At block 504, the sub-OBT identifies the sub-OBT as a "sub-OBT". Hereinafter, the sub-OBT can be used to provision the other devices.

At block 505, the sub-OBT discovers a new device.

For example, the sub-OBT can transmit a device query request via a broadcast message or a multicast message, and provision the new device when the sub-OBT discovers the new device.

At block 506, a device owner transfer process is performed between the sub-OBT and the new device.

In this process, the sub-OBT configures a device ID and a device owner ID of the new device. The device ID of the new device is a unique ID of the new device. The device owner ID of the new device is configured to be the same as the device ID of the sub-OBT, indicating that the new device and the sub-OBT belong to a same user, in this case, the new device and the main-OBT also belong to the same user.

At block 507, the sub-OBT configures a credential resource of the new device.

The configured credential resource of the new device includes credential information of each of the other devices with the same device owner ID as the new device.

The sub-OBT can also instruct each of the other devices with the same device owner ID as the new device to update a credential resource of each of the other devices, i.e., add credential information of the new device to the credential resource of each of the other devices. After credential information exchange, among these devices, any device can confirm identifies of all other devices.

At block 508, the sub-OBT configures an access control resource of the new device.

The configured access control resource of the new device may include access control information of each of the other devices with the same device owner ID as the new device. An ACL can be established in the new device, and ACE information of each of the other devices with the same device owner ID as the new device is added to the ACL of the new device.

The sub-OBT can also instruct each of the other devices with the same device owner ID as the new device to update an access control resource of each of the other devices, i.e., add access control information of the new device to the access control resource of each of the other devices.

At block 509, the sub-OBT instructs the main-OBT to update a credential resource of the main-OBT.

At block 510, the main-OBT updates the credential resource of the main-OBT, and informs each of the other devices to update a credential resource of each of the other devices.

The main-OBT updates the credential resource of the main-OBT, i.e., add the credential information of the new device to the credential resource of the main-OBT. The main-OBT can transmit the credential information of the new device to each of the other devices. For example, the main-OBT transmits the credential information of the new device to each of other sub-OBTs, and each of the other sub-OBTs can transmit the credential information of the new device to each of devices provisioned by each of the other sub-OBTs, such that all devices are added with the credential information of the new device.

At block 511, the sub-OBT instructs the main-OBT to update an access control resource of the main-OBT. The operation at block 511 and the operation at block 509 can be performed together, i.e., block 511 and block 509 can be combined into one block.

At block 512, the main-OBT updates the access control resource of the main-OBT, and informs each of the other devices to update an access control resource of each of the other devices.

The main-OBT updates the access control resource of the main-OBT, i.e., adds the access control information of the new device to the access control resource of the main-OBT. The main-OBT can inform each of the other devices to add the access control information of the new device to each of the other devices. For example, the main-OBT informs each of the other sub-OBTs to add the access control information of the new device to each of the other devices, and each of the other sub-OBTs informs each of the devices provisioned by each of the other sub-OBTs to add the access control information of the new device to each of the devices provisioned by each of the other sub-OBTs, such that all devices are added with the access control information of the new device.

Of course, the main-OBT may not add the access control information of the new device to the main-OBT, in this case, the new device has no permission to access any resources of the main-OBT.

Compared with FIG. 5, a first device in FIG. 6, i.e., a sub-OBT, has a permission to access each of other devices with the same device owner ID as the sub-OBT. Therefore, in FIG. 6, the sub-OBT can inform each of the other devices with the same device owner ID as the sub-OBT to add credential information and access control information of a second device (i.e., a new device) to each of the other devices. As illustrated in FIG. 6, the method includes the following.

At block 601, a main-OBT discovers an unprovisioned sub-OBT.

For example, the main-OBT can transmit a device query request via a broadcast message or a multicast message, and provision a new device when the main-OBT discovers the new device.

At block 602, a device owner transfer process is performed between the main-OBT and the sub-OBT.

In this process, the main-OBT configures a device ID and a device owner ID of the sub-OBT. The device ID of the sub-OBT is a unique ID of the sub-OBT. The device owner ID of the sub-OBT is configured to be the same as a device ID of the main-OBT, indicating that the sub-OBT and the main-OBT belong to a same user.

At block 603, the main-OBT configures a DCR of the sub-OBT.

For example, the main-OBT configures the credential information of the sub-OBT, and adds credential information of each of other devices with the same device owner ID as the sub-OBT to the sub-OBT, to confirm identities of the main-OBT and the sub-OBT. The main-OBT establishes an ACL in the sub-OBT, and adds ACE information of each of the other devices to the ACL of the sub-OBT.

In addition, the main-OBT can also instruct each of the other devices with the same device owner ID as the sub-OBT to update a credential resource and an access control resource of each of the other devices, i.e., add credential information of the sub-OBT to the credential resource of each of the other devices and add the access control information of the sub-OBT to the access control resource of each of the other devices.

At block 604, the sub-OBT identifies the sub-OBT as a "sub-OBT". Hereinafter, the sub-OBT can be used to provision each of the other devices.

At block 605, the sub-OBT discovers a new device.

For example, the sub-OBT can transmit a device query request via a broadcast message or a multicast message, and provision the new device when the sub-OBT discovers the new device.

At block 606, a device owner transfer process is performed between the sub-OBT and the new device.

In this process, the sub-OBT configures a device ID and a device owner ID of the new device. The device ID of the new device is a unique ID of the new device. The device owner ID of the new device is configured to be the same as the device ID of the sub-OBT, indicating that the new device and the sub-OBT belong to a same user, in this case, the new device and the main-OBT also belong to the same user.

At block 607, the sub-OBT configures a credential resource of the new device.

The configured credential resource of the new device includes credential information of each of the other devices with the same device owner ID as the new device.

The sub-OBT can also instruct each of the other devices with the same device owner ID as the new device to update a credential resource of each of the other devices, i.e., add credential information of the new device to the credential resource of each of the other devices. After credential information exchange, among these devices, any device can confirm identities of all other devices.

At block 608, the sub-OBT configures an access control resource of the new device.

The configured access control resource of the new device includes access control information of each of the other devices with the same device owner ID as the new device. An ACL can be established in the new device, and ACE information of each of the other devices is added to the ACL of the new device.

The sub-OBT can also instruct each of the other devices with the same device owner ID as the new device to update an access control resource of each of the other devices, i.e., add access control information of the new device to the access control resource of each of the other devices.

At block 609, the sub-OBT instructs the main-OBT to update a credential resource of the main-OBT.

At block 610, the main-OBT updates the credential resource of the main-OBT.

The main-OBT updates the credential resource of the main-OBT, i.e., adds the credential information of the new device to the credential resource of the main-OBT.

At block 611, the sub-OBT informs each of the other devices to update a credential resource of each of the other devices.

For example, the sub-OBT transmits the credential resource of the new device to each of other sub-OBTs, and each of the other sub-OBTs can further transmit the credential resource of the new device to each of devices provisioned by each of the other sub-OBTs, such that all devices are added with the credential resource of the new device.

At block 612, the sub-OBT instructs the main-OBT to update an access control resource of the main-OBT.

The operation at block 611 and the operation at block 609 can be performed together, i.e., block 611 and block 609 can be combined into one block.

At block 613, the main-OBT updates the access control resource of the main-OBT.

The main-OBT updates the access control resource of the main-OBT, i.e., add the access control information of the new device to the access control resource of the main-OBT.

Of course, the main-OBT may not add the access control information of the new device to the main-OBT, in this case, the new device has no permission to access any resources of the main-OBT.

At block 614, the sub-OBT informs each of the other devices to update an access control resource of each of the other devices.

For example, the sub-OBT can inform each of the other sub-OBTs to add the access control information of the new device to each of the other sub-OBTs, and each of the other sub-OBTs informs each of the devices provisioned by each of the other sub-OBTs to add the access control information of the new device to each of the devices, such that all devices are added with the access control information of the new device.

The sub-OBT in FIG. 6 has a permission to access each of other devices with the same device owner ID as the sub-OBT, and by means of the operations at block 611 and block 614, the credential resource and the access control resource of each of the other devices are respectively added with related information of the new device, such that the main-OBT may not inform other devices.

As can be seen from FIG. 5 and FIG. 6, since the device owner ID of the new device is the same as the device ID of the main-OBT, the new device obtains the credential information and the access control information of the main-OBT, and the main-OBT obtains the credential information and the access control information of the new device, the new device and the main-OBT can communicate mutually. Since devices provisioned by different OBTs have the same device owner ID, and among the devices provisioned by different OBTs, any device is added with credential information and access control information of all other devices, the devices provisioned by the different OBTs can communicate mutually. Therefore, in a home, all devices can communicate mutually, greatly improving user experience.

The bi-directional arrows used in some operations in the above-mentioned accompanying drawings indicate that there may be signaling interactions between devices in the process, and for the sake of simplicity, the detailed signaling interactions in the operation are not illustrated in the accompanying drawings above.

Various implementations and/or technical features of the various implementations may be implemented in any combination with each other without conflict, and technical solutions thus obtained shall also fall within the protection cope of the disclosure.

In implementations of the disclosure, the sequence number of each process does not mean an order of execution, and the order of execution of each process should be determined by its function and an internal logic and shall not constitute any limitation to an implementation process of the implementations of the present disclosure.

The methods according to implementations of the disclosure are described in detail above. In combination with FIGS. 7 to 11, apparatuses used in implementations of the disclosure will be described below, and technical features described in the various method implementations are applicable for the following apparatus implementations.

Figure 7:
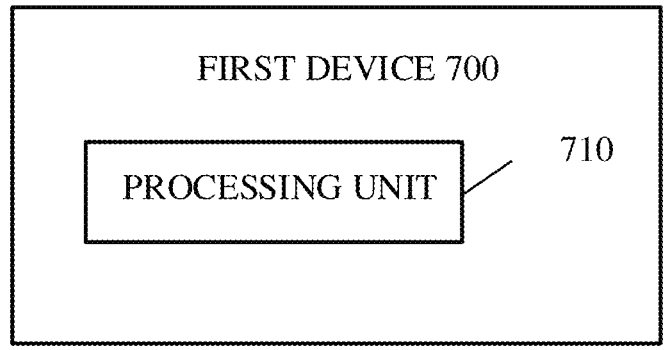
FIG. 7 is a schematic block diagram illustrating an IoT device according to implementations of the disclosure.

FIG. 7 is a schematic block diagram illustrating an IoT device according to implementations of the disclosure. The IoT device is a first device. As illustrated in FIG. 7, the first device 700 includes a processing unit 710.

The processing unit 710 is configured to discover an unprovisioned second device, and the first device is a sub-OBT.

The processing unit 710 is configured to configure a device owner ID of the second device, where the configured device owner ID of the second device is the same as a device owner ID of the first device, and devices with the same device owner ID are able to communicate mutually.

Therefore, since different devices can communicate with each other under a condition that the devices have the same device owner ID, if the first device configures the device owner ID of the second device to be the same as that of the first device, devices provisioned by different OBTs can communicate mutually.

In an example, the device owner ID of the first device is a device ID of a main-OBT that provisions the first device, or a device owner ID of another sub-OBT that provisions the first device.

In an implementation, the processing unit 710 is further configured to configure a DCR of the second device.

In an implementation, the DCR of the second device includes a credential resource. The configured credential resource of the second device includes credential information of a device with the same device owner ID as the second device.

In an implementation, the processing unit 710 is further configured to instruct each of other devices provisioned by the first device to update a credential resource of each of the other devices, where the updated credential resource includes credential information of the second device.

In an implementation, the processing unit 710 is further configured to instruct the main-OBT to update a credential resource of the main-OBT, where the updated credential resource of the main-OBT includes the credential information of the second device.

In an implementation, the processing unit 710 is further configured to instruct each of other devices with the same device owner ID as the first device to update a credential resource of each of the other devices with the same device owner ID as the first device, where the updated credential resource includes the credential information of the second device.

In an implementation, the DCR includes an access control resource, where the configured access control resource of the second device includes access control information of the device with the same device owner ID as the second device.

In an implementation, the processing unit 710 is further configured to instruct each of the other devices provisioned by the first device to update an access control resource of each of the other devices, where the updated access control resource includes access control information of the second device.

In an implementation, the processing unit 710 is further configured to instruct the main-OBT to update an access control resource of the main-OBT, where the updated access control resource of the main-OBT includes the access control information of the second device.

In an implementation, the processing unit 710 is further configured to instruct each of the other devices with the same device owner ID as the first device to update an access control resource of each of the other devices with the same device owner ID as the first device, where the updated access control resource includes the access control information of the second device.

In an implementation, the processing unit 710 is further configured to identify the first device as the sub-OBT.

It can be understood that, the IoT device 700 can perform corresponding operations performed by the first device in the methods of the implementations of the disclosure, which will not be repeated herein for the sake of simplicity.

Figure 8:
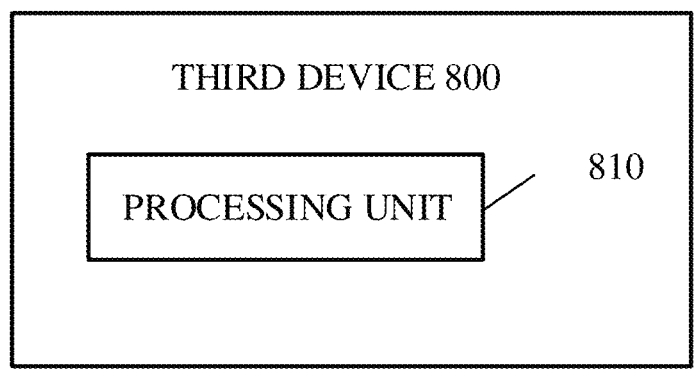
FIG. 8 is a schematic block diagram illustrating an IoT device according to implementations of the disclosure.

FIG. 8 is a schematic block diagram illustrating an IoT device 800 according to implementations of the disclosure. The IoT device is a third device. As illustrated in FIG. 8, the IoT device 800 includes a processing unit 810.

The processing unit 810 is configured to update a DCR of the third device according to an indication from a first device, where the updated DCR of the third device includes credential information of a second device and/or access control information of the second device.

The third device is a main-OBT. The first device is a sub-OBT. The second device is provisioned by the first device. A device owner ID of the second device is the same as a device owner ID of the first device, and devices with the same device owner ID are able to communicate mutually.

Therefore, since different devices can communicate with each other under a condition that the devices have the same device owner ID, under a condition that the first device configures a device owner ID of the second device to be the same as the device owner ID of the first device, and causes credential information and/or access control information of the third device to be added to the second device and credential information and/or access control information of the second device to be added to the third device, even the second device is not provisioned by the third device, the third device and the second device can also communicate mutually.

In an implementation, the processing unit 810 is further configured to instruct each of other devices with the same device owner ID as the third device to update a credential resource of each of the other devices with the same device owner ID as the third device, where the updated credential resource includes credential information of the second device.

In an implementation, the processing unit 810 is further configured to instruct each of the other devices with the same device owner ID as the third device to update an access control resource of each of the other devices with the same device owner ID as the third device, where the updated access control resource includes access control information of the second device.

In an implementation, the processing unit 810 is further configured to identify the third device as the main-OBT.

In an implementation, the first device is the sub-OBT provisioned by the third device.

It can be understood that, the IoT device 800 can perform corresponding operations performed by the third device in the methods of the implementations of the disclosure, which will not be repeated herein for the sake of simplicity.

Figure 9:
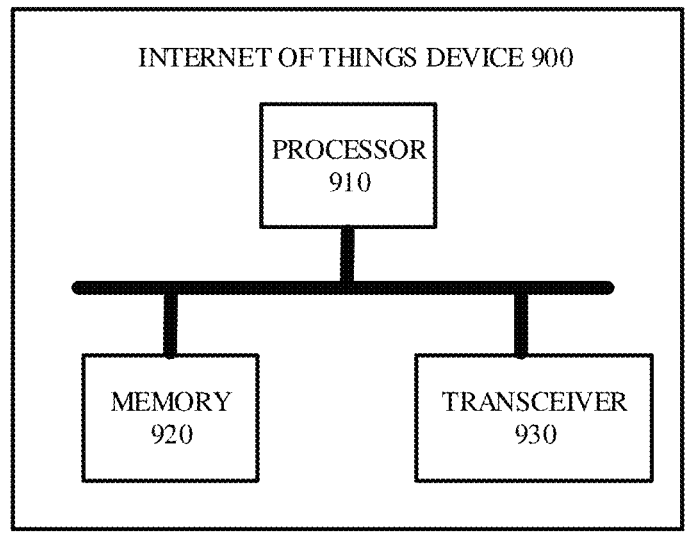
FIG. 9 is a schematic structural diagram illustrating an IoT device according to implementations of the disclosure.

FIG. 9 is a schematic structure diagram illustrating an IoT device 900 according to implementations of the disclosure. The device 900 illustrated in FIG. 9 includes a processor 910.

In an implementation, the processor 910 is configured to invoke and execute the computer programs stored in the memory, to perform the methods in the implementations of the disclosure.

In an implementation, as illustrated in FIG. 9, the device 900 further includes a memory 920. The processor 910 is configured to invoke and execute the computer programs stored in the memory 920, to perform the methods in the implementations of the disclosure.

The memory 920 may be a separate device from the processor 910, or be integrated into the processor 910.

In an implementation, as illustrated in FIG. 9, the device 900 further includes a transceiver 930. The processor 910 can control the transceiver 930 to communicate with other devices. For example, the transceiver 930 can transmit information or data to other devices, or receive information or data transmitted by other devices.

The transceiver 930 may include a transmitter and a receiver, and further include one or more antennas.

The device 900 may be the first device in the implementations of the disclosure, and the device 900 can implement a corresponding process implemented by the first device in each of the methods of the implementations of the disclosure, which will not be repeated herein for the sake of simplicity.

The device 900 may be the second device in the implementations of the disclosure, and the device 900 can implement a corresponding process implemented by the second device in each of the methods of the implementations of the disclosure, which will not be repeated herein for the sake of simplicity.

Figure 10:
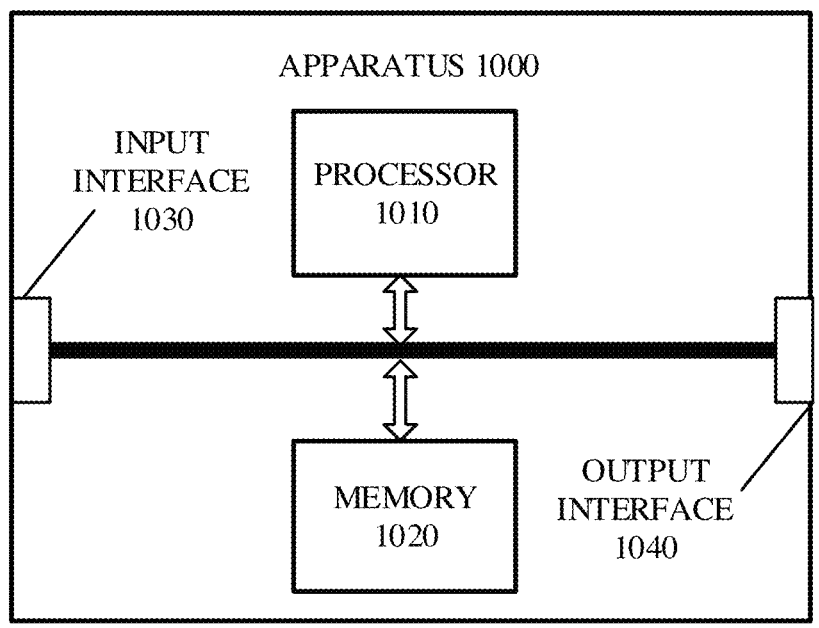
FIG. 10 is a schematic structural diagram illustrating an apparatus for provisioning an IoT device according to implementations of the disclosure.

FIG. 10 is a schematic structure diagram of an apparatus 1000 for provisioning an IoT device according to implementations of the disclosure. The apparatus 1000 illustrated in FIG. 10 includes a processor 1010.

In an implementation, the processor 1010 is configured to invoke and execute the computer programs stored in the memory, to perform the methods in the implementations of the disclosure.

In an implementation, as illustrated in FIG. 10, the apparatus 1000 further includes a memory 1020. The processor 1010 is configured to invoke and execute the computer programs stored in the memory 1020, to perform the methods in the implementations of the disclosure.

The memory 1020 may be a separate device from the processor 1010, or be integrated into the processor 1010.

In an example, the apparatus 1000 may further include an input interface 1030. The processor 1010 can control the input interface 1030 to communicate with other devices or chips. For example, the input interface 1030 can obtain information or data transmitted by other devices or chips.

In an example, the apparatus 1000 may further include an output interface 1040. The processor 1010 can control the output interface 1040 to communicate with other devices or chips. For example, the output interface 1040 can output information or data to other devices or chips.

The apparatus 1000 can be applied to the first device of the implementations of the disclosure, and the apparatus can implement a corresponding process implemented by the first device in each of the methods in the implementations of the disclosure, which will not be repeated herein for the sake of simplicity.

The apparatus 1000 can be applied to a third device of the implementations of the disclosure, and the apparatus can implement a corresponding process implemented by the third device in each of the methods in the implementations of the disclosure, which will not be repeated herein for the sake of simplicity.

The apparatus 1000 may be a chip. The chip may be a system-level chip, a system chip, a chip system, or a system-on-a-chip (SoC) chip.

The processor in the implementations of the disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the disclosure can be implemented or executed. The general purpose processor may be a microprocessor, or the processor may be any conventional processor or the like. The steps of the method disclosed in the implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM) or an electrically erasable programmable memory, registers, and the like. The storage medium is located in the memory. The processor reads the information in the memory, and completes the steps of the above-mentioned method with the hardware thereof.

In implementations of the disclosure, the memory may be a volatile memory or a non-volatile memory, or may include both the volatile memory and the non-volatile memory. The non-volatile memory may be a ROM, a PROM, an erasable programmable read-only memory (EPROM), an electrically erasable programmable read-only memory (EEPROM), or a flash memory. The volatile memory can be a RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM).

The above-mentioned memory is an example but not limitation. For example, the memory may be an SRAM, a DRAM, an SDRAM, a DDRSDRAM, an ESDRAM, an SLDRAM, and a DRRAM. The memory described herein is intended to include, but is not limited to, these and any other suitable types of memory.

Figure 11:
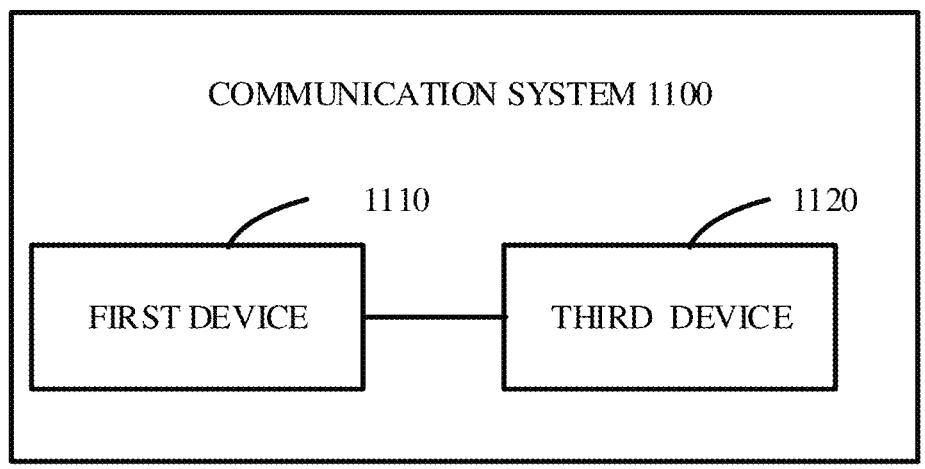
FIG. 11 is a schematic block diagram illustrating a communication system according to implementations of the disclosure.

FIG. 11 a schematic block diagram illustrating a communication system 1100 according to implementations of the disclosure. As illustrated in FIG. 11, the communication system 1100 includes a first device 1110 and a third device 1120. The third device 1120 is a main-OBT, and the first device 1110 is a sub-OBT.

The first device 1110 is configured to discover an unprovisioned second device, and configure a device owner ID of the second device, where the configured device owner ID of the second device is the same as a device owner ID of the first device.

The third device 1120 is configured to update a DCR of the third device according to an indication from the first device, where the updated DCR of the third device includes credential information of the second device and/or access control information of the second device.

The first device 1110 can be configured to perform a corresponding function implemented by the first device in the methods in the implementations of the disclosure, and the composition of the first device 1110 may be illustrated as the first device 700 in FIG. 7, which will not be repeated herein for the sake of simplicity.

The third device 1120 can be configured to perform a corresponding function implemented by the third device in the methods in the implementations of the disclosure, and the composition of the third device 1120 may be illustrated as the third device 800 in FIG. 8, which will not be repeated herein for the sake of simplicity.

A computer-readable storage medium is provided according to implementations of the disclosure. The computer-readable storage medium is configured to store computer programs. The computer-readable storage medium may be applied to the first device in the disclosure, and the computer programs are operable with a computer to perform a corresponding process implemented by the first device in each of the methods in the implementations of the disclosure, which will not be repeated herein for the sake of simplicity. In an example, the computer-readable storage medium may be applied to the third device in the implementations of the disclosure, and the computer programs are operable with a computer to perform a corresponding process implemented by the third device in each of methods in the implementations of the disclosure, which will not be repeated herein for the sake of simplicity.

A computer program product is provided according to implementations of the disclosure. The computer program product includes computer program instructions. The computer program product may be applied to the first device in the implementations of the disclosure, and the computer program instructions are operable with a computer to perform a corresponding process implemented by the first device in each of the methods in the implementations of the disclosure, which will not be repeated herein for the sake of simplicity. In an example, the computer program product may be applied to the third device in the implementations of the disclosure, and the computer program instructions are operable with a computer to perform a corresponding process implemented by the third device in each of the methods in the implementations of the disclosure, which will not be repeated herein for the sake of simplicity.

A computer program is provided according to implementations of the disclosure. The computer program may be applied to the first device in the implementations of the disclosure, and the computer program is operable with a computer to perform a corresponding process implemented by the first device in each of the methods of the implementations of the disclosure, which will not be repeated herein for the sake of simplicity. In an example, the computer program may be applied to the third device in the implementations of the disclosure, and the computer program is operable with a computer to perform a corresponding process implemented by the third device in each of the methods in the implementations of the disclosure, which will not be repeated herein for the sake of simplicity.

It can be understood that, the terms "system" and "network" in the implementations of the disclosure are often used interchangeably. The term "and/or" in the disclosure is simply a description of an association relationship of associated objects, indicating that three relationships can exist, for example, A and/or B, which can indicate the existence of A alone, A and B together, and B alone. In addition, the character "/" in the disclosure generally indicates that associated objects are in an "or" relationship.

In the implementations of the disclosure, "B corresponding to A" indicates that B is associated with A, and B can be determined according to A. It can be understood that, determining B according to A does not indicate that B is determined only according to A, instead, determining B according to A indicates that B can be determined according to A and/or other information.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the disclosure.

Various functional units described in the implementations herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the disclosure. The above-mentioned storage medium may include various kinds of medium that can store program codes, such as a universal serial bus (USB) flash disk, a mobile hard drive, a ROM, a RAM, a magnetic disk, or an optical disk.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for provisioning an internet of things device, comprising:
    discovering, by a first device, an unprovisioned second device, wherein the first device is a sub-onboarding tool (sub-OBT);
    configuring, by the first device, a device owner identity (ID) of the second device, wherein the configured device owner ID of the second device is the same as a device owner ID of the first device, and devices with the same device owner ID are able to communicate mutually;
    configuring, by the first device, a device configuration resource (DCR) of the second device, wherein the DCR comprises a credential resource, wherein the configured credential resource of the second device comprises credential information of the devices with the same device owner ID as the second device; and
    instructing, by the first device, each of other devices provisioned by the first device to update a credential resource of each of the other devices provisioned by the first device, wherein the updated credential resource of each of the other devices provisioned by the first device comprises credential information of the second device.

2. The method of claim 1, wherein the device owner ID of the first device is a device ID of a main-OBT that provisions the first device, or the device owner ID of the first device is a device owner ID of another sub-OBT that provisions the first device.

3. The method of claim 1, wherein the DCR further comprises an access control resource, wherein the configured access control resource of the second device comprises access control information of the devices with the same device owner ID as the second device.

4. The method of claim 3, further comprising:
    instructing, by the first device, each of other devices provisioned by the first device to update an access control resource of each of the other devices provisioned by the first device, wherein the updated access control resource of each of the other devices provisioned by the first device comprises access control information of the second device.

5. A method for provisioning an internet of things device, comprising:
    updating, by a third device, a device configuration resource (DCR) of the third device according to an indication from a first device, wherein the updated DCR of the third device comprises at least one of credential information of a second device or access control information of the second device, wherein the third device is a main-onboarding tool (main-OBT), the first device is a sub-OBT, the second device is provisioned by the first device, a device owner identity (ID) of the second device is the same as a device owner ID of the first device, and devices with the same device owner ID are able to communicate mutually; and
    instructing, by the third device, each of other devices with the same device owner ID as the third device to update an access control resource of each of the other devices with the same device owner ID as the third device, wherein the updated access control resource of each of the other devices with the same device owner ID as the third device comprises access control information of the second device.

6. The method of claim 5, further comprising:
    instructing, by the third device, each of other devices with the same device owner ID as the third device to update a credential resource of each of the other devices with the same device owner ID as the third device, wherein the updated credential resource of each of the other devices with the same device owner ID as the third device comprises credential information of the second device.

7. An internet of things device, the internet of things device being a first device, the first device comprising:
    a processor; and
    a memory configured to store a computer program;
    the computer program, when executed by the processor, causes the processor to:
        discover an unprovisioned second device, wherein the first device is a sub-onboarding tool (sub-OBT);
        configure a device owner identity (ID) of the second device, wherein the configured device owner ID of the second device is the same as a device owner ID of the first device, and devices with the same device owner ID are able to communicate mutually;
        configure a device configuration resource (DCR) of the second device, wherein the DCR comprises a credential resource, wherein the configured credential resource of the second device comprises credential information of the device with the same device owner ID as the second device; and instruct a main-OBT to update a credential resource of the main-OBT, wherein the updated credential resource of the main-OBT comprises the credential information of the second device.

8. The device of claim 7, wherein the DCR further comprises an access control resource, wherein the configured access control resource of the second device comprises access control information of the device with the same device owner ID as the second device.

9. The device of claim 8, wherein the computer program, when executed by the processor, further causes the processor to:
    instruct the main-OBT to update an access control resource of the main-OBT, wherein the updated access control resource of the main-OBT comprises the access control information of the second device.

\* \* \* \* \*